July 30, 1935.   J. A. PURVES   2,009,904
VEHICLE
Filed Sept. 16, 1931   3 Sheets-Sheet 1
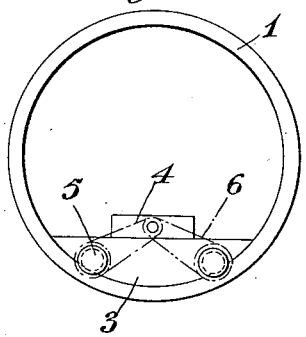
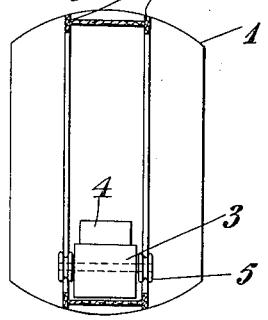
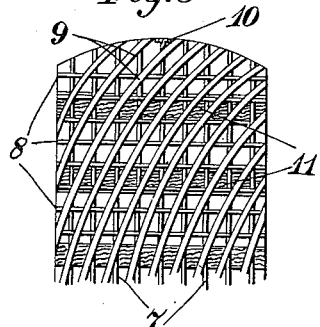
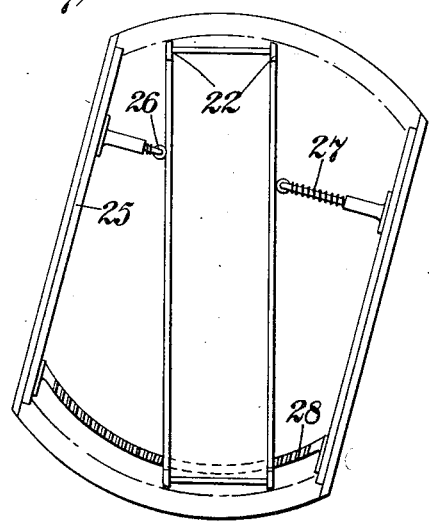
J. A. Purves
INVENTOR
By: Marks &Clerk
Attys.

July 30, 1935. J. A. PURVES 2,009,904
VEHICLE
Filed Sept. 16, 1931 3 Sheets-Sheet 2
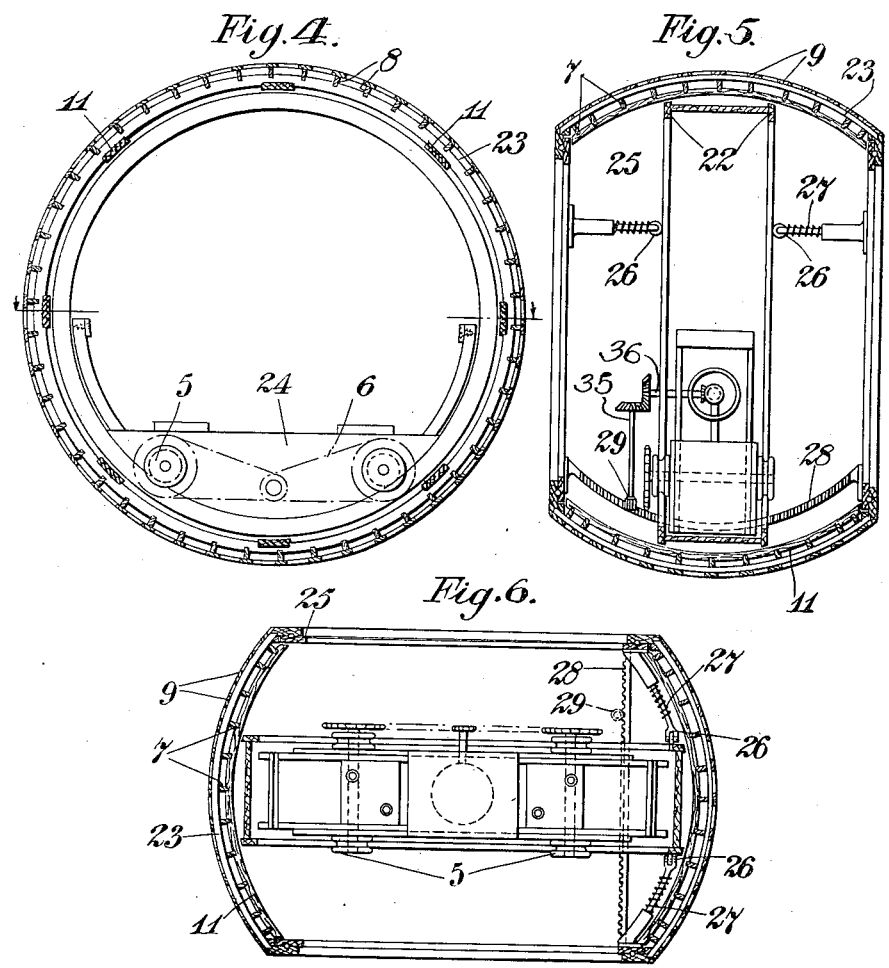

July 30, 1935. J. A. PURVES 2,009,904
VEHICLE
Filed Sept. 16, 1931 3 Sheets-Sheet 3

J. A. Purves
INVENTOR
By: Glascock Downing & Seebold
Attys.

Patented July 30, 1935

2,009,904

UNITED STATES PATENT OFFICE 2,009,904

VEHICLE

John Archibald Purves, Trull, Taunton, England

Application September 16, 1931, Serial No. 563,179
In Great Britain September 26, 1930

7 Claims. (Cl. 180—21)

This invention relates to vehicles which are propelled either by mechanical, electrical or hydraulic means, by human agency or by animal traction and aims at the provision of a vehicle of increased efficiency, capable especially of movement over very rough and uneven ground and of guarding the occupant from discomfort on account of such roughness and irregularities.

The physical principles upon which the invention rests are that for efficient operation any propelled moving parts should pass over or run over a regular, even surface, e. g. flat track or rails, while for smooth movement of the whole vehicle over irregular surfaces it is desirable for a single contacting surface (between the vehicle and the ground) preferably of small area so that single point contact is approached. Hitherto various suggestions have been made for providing a vehicle consisting in a single wheel or cylinder within which run other wheels or a trolley or like device. Such vehicles, which have been known as mono-cycles or mono-cars, achieved some publicity in the early days of mechanical road transport and indicate slight appreciation of the underlying physical principles set forth above, but were found unsatisfactory in practice owing to various unsolved difficulties which were met, more especially in relation to stability and steering.

The object of the present invention is to overcome these difficulties and to provide a practicable and improved form of vehicle based upon the above principles.

With this object in view the invention consists in a vehicle comprising an outer casing of spherical form, a track movably mounted in and borne by said casing, and a carrier mounted to run upon said track. Movement of the carrier upon said track causes rolling movement of the whole vehicle in the direction of movement of the carrier, while movement of the track relatively to the outer casing alters the line or direction of movement of the carrier relatively to the outer casing and thus causes lateral inclination of the outer casing whereby steering can be effected.

Further features of the invention will become apparent from the following description of a few embodiments thereof which are given by way of example. These will be more readily understood by reference to the accompanying drawings, wherein:—

Figures 1 and 2 represent respectively a side view and an end sectional view of one form of the invention in somewhat diagrammatic representation;

Figure 3 represents a form of lattice work which the spherical casing may assume;

Figures 4, 5 and 6 represent, in section, respectively a side view, end view and plan of another modification of a vehicle according to the invention in which the track inside the casing is movable relatively thereto, and Figure 7 represents a view similar to Figure 5 when the track has been displaced to effect a turn of the vehicle.

Figure 8:
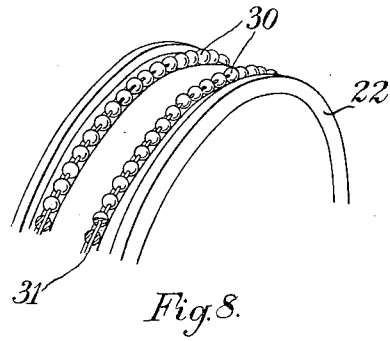
Figure 8 represents in perspective a portion of a movable track provided with antislip means.

An elementary form of the invention is shown diagrammatically in Figures 1 and 2 of the drawings.

In these figures 1 represents the outer casing of the vehicle in the form of an annulus of a sphere or spheroid. It must be understood that wherever throughout the description and claims of this specification the words "sphere" or "spherical" are used they cover also the term "spheroid" or "spheroidal", unless the context otherwise requires. For the sake of clarity the former terms only will in general be used, but the broader meaning indicated above should be borne in mind for a clear understanding of the invention. A double rail track 2 is provided within the casing 1 and bears a trolley or carrier 3 having mounted thereon a driving motor 4 connected to the wheels 5, which run on the track 2, by means of chains 6 or like gearing. The wheels 5 may be flanged as shown to hold them on the rails of the track, and the trolley 3 may be provided with seating accommodation for one or more passengers and/or with supports for receiving a load to be carried. It will be clear that as the trolley 3 is driven forward by the motor 4 on the track 2, the centre of gravity of the whole vehicle is displaced, and the outer casing 1 is thus caused to roll forward, giving continuous forward motion to the vehicle; while any lateral displacement of the centre of gravity of the trolley 3 and/or its borne load will cause lateral tilting of the outer casing 1 which, when accompanying a forward movement, causes a turning of the vehicle. Such an effect may be employed to allow the vehicle to be steered by passengers on the trolley 3 and means for doing so will be described more fully below. It will be observed that the centre of gravity of the vehicle is always below the centre of the sphere and the vehicle is therefore stable, the casing always tending to maintain an equilibrium position and prevent overbalance on account of its spherical shape.

In order that the occupants of the vehicle may be able to see in the direction of travel the outer spherical casing 1 may be formed as an open lattice or network, formed, for example, by a number of laths secured to a framework of keels and cross-ribs. These members may be of wood, metal or any other suitable material. Such a casing is shown in part in Figure 3 where there are shown a number of circular keels 7 held parallel to one another and at fixed distances apart by a plurality of cross-members or ribs 8, a plurality of narrow laths 9 being spread across the outer surfaces of the keels at an angle of say 45° to the plane thereof, each lath forming part of a great circle of the sphere. If desired for increased strength additional "great-circle" laths may be provided inside the cross-members or ribs holding the keels together, or the cross-members may be replaced by such an internal arrangement of laths, which will preferably encircle the sphere in a direction perpendicular or at an inclination to the outer laths.

Any or all of the various members (especially the keels) may be, and preferably are, of I or T section for increased strength as shown at 10. Cross battens 11 may be provided within the casing to receive the track 2.

In order to allow the vehicle to be steered as stated above, means are provided to effect lateral displacement of the whole or major portion of the borne load, and according to the invention this is effected by the provision of a track which is movable within the outer spherical casing, thus allowing the trolley 3 and the load which it bears to move to one side or other of the central vertical plane of the outer spherical casing in its normal direction of motion. One form of the invention is shown in Figures 4, 5 and 6 wherein similar references indicate parts corresponding to those of Figures 1, 2 and 3. The inner battens 11, or the ribs of the outer spherical casing, have their inner faces shaped as portions of a sphere, and may be smoothed or polished, or lubricated (e. g. by carbon) to allow easy lateral movement of the track thereon. The track is in the form of two spaced rail members 22 and is of slightly smaller diameter than the outer spherical casing. A trolley 24, is adapted to ride on this track 22 and it is found that the weight of the trolley and load it carries is sufficient to cause the free track member 22, on account of its slightly smaller diameter, to be lodged firmly relative to the lowermost cross-members or ribs 11 of the outer spherical casing thus preventing it from slipping longitudinally, as soon as the trolley is propelled, and acting as a roller between trolley and sphere. This lodging is found to be sufficient to allow the trolley quite satisfactorily to mount the track and cause the whole vehicle to roll in a manner identical with that described above in connection with Figures 1 and 2. In order that lateral movement of the track may be effected a rack 28 may extend across the interior of the vehicle between roller rings 25 which run against flanges on the sides of the outer spherical casing as shown. A rod 36 having a pinion at each end is rotated by the steering wheel, the pinion at the other end gears with a pinion on the rod 35 to rotate the latter. A pinion 29 on the other end of rod 35 gears with the rack 28. As rods 35 and 36 are fixed with respect to the trolley the latter must, upon rotation of the pinion 29, move sideways carrying with it the movable track 22, which slides laterally over the battens 11. Steadying arms 27 may be provided secured to the roller rings 25 and projecting inwards, as shown, to the track, against which they may bear through spring pressed rollers 26. These oppose lateral oscillations or play of the track 22 but are of telescopic form to allow lateral displacement of the track for steering purposes as described above. A typical relative position of the track and casing, and a typical inclination when the vehicle is being turned to the right, are shown in Figure 7.

If it is found that the track 22 does not become lodged against the battens 11 and therefore has a longitudinal slipping under the driving action of the trolley means, such as friction surfaces or roller bearings, may be provided on the contacting portions of the free track member and the cross-battens of the casing, adapted to prevent slip of the track member perpendicular to the ribs 11 while allowing free transverse movement, i. e. along the battens. In one convenient form shown in Figure 8 such anti-slip means may comprise a series of ball bearings 30 threaded upon a wire 31 which is tensioned round the outer surface of the track 22. These balls will thus ride on the battens or cross-members 11 and it will be clear that since they are threaded upon the wire the balls cannot rotate about an axis parallel to the battens and will therefore oppose longitudinal rotational movement of the track within the sphere, while they can turn about the wire and will therefore offer but little resistance to any transverse movement of the track.

Figure 9:
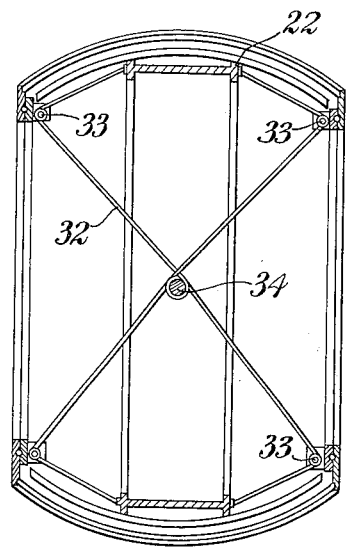
Figure 9 shows diagrammatically an alternative arrangement for moving the track employing a crossed flexible cable attached to the track and operating over pulleys.

In another arrangement shown diagrammatically in Figure 9 the track 22 may be displaced by wire cables 32 extending from its sides over pulleys 33 on the roller rings 25 on the flanges of the outer casing, as shown. These cables may be wound upon a control member 34 so that by winding or unwinding them the track may be displaced, and it will be clear that, since it is placed at the centre of the sphere, the member 34 is always easily accessible from the trolley running in the track 22.

Figure 10:
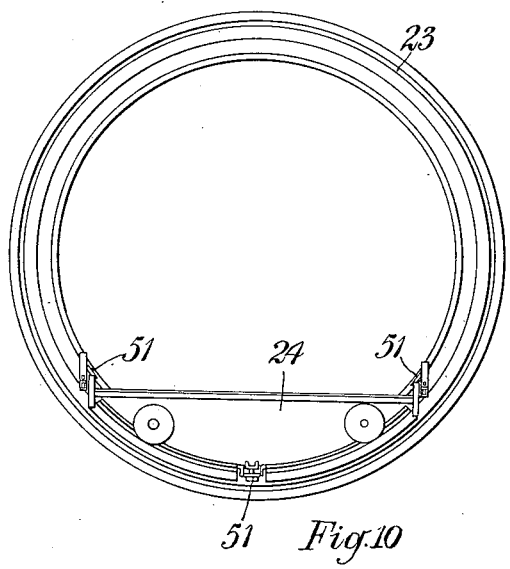
Figures 10, 11 and 12 represent in section respectively a side view, plan and end view of a further modification of a vehicle according to the invention.
Figure 12:
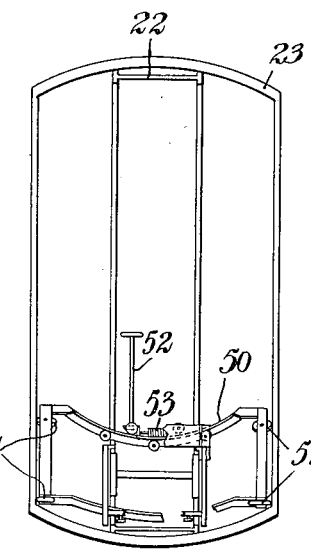
Figure 11:
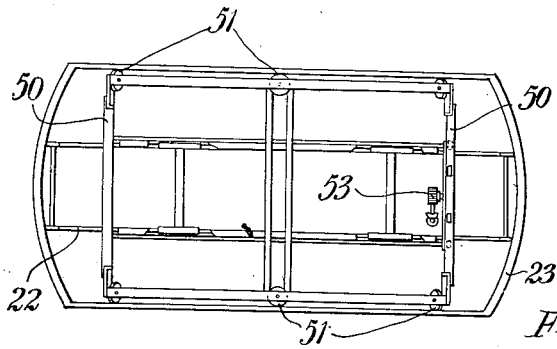

A modified construction of the invention is illustrated in Figures 10, 11 and 12. In this form a frame formed of interconnected cross-bars or arms 50 terminating in rollers 51 which bear against the flanges of the outer casing, is connected to and moves with the trolley 24. A steering column 52 on the carrier trolley is connected to this frame by gearing or the like 53 and it will be clear that turning of the steering column effects relative movement between the trolley and the arms 50, and the trolley transmits the displacing force to the track 22 which is thus shifted laterally. The arms 50 are preferably, as shown, arcs of circles concentric with the spherical outer casing.

It will be seen that from the examples given above the vehicle cannot tip over or capsize unless the centre of gravity falls outside the spherical or spheroidal surface. The centre of gravity in practice can be very low by having the machinery or the like mounted as low down upon the carriage as possible and the passengers further seated so that they are as near to the ground as possible.

It must be understood that all the fitments provided on known vehicles may be included in vehicles described herein. Thus I may provide brakes upon the wheels of the trolley and/or between the trolley and the track; lamps to warn pedestrians and other traffic and to illuminate the road; a number plate and other items legally necessary, e. g. a warning horn or the like; and provisions for the comfort of passengers such as pneumatic or sprung upholstery, heating devices, screens etc.

In practice I have found that a vehicle made in accordance with the description hereinbefore given travels along very easily and negotiates unevenness in the ground or road with surprising ease. Further, shocks due to unevenness appear to be reduced to a great extent by the spherical area being of fairly large dimensions and therefore not entering into small holes or unevenness on the ground.

Any of the forms of the invention described above may be made in miniature, of small dimensions, and employed or vended as toys or for other amusement purposes. In such forms which are not primarily intended to carry passengers, many of the refinements, e. g. latticed structure etc., which give added comfort internally of the vehicle need not be incorporated.

It is to be understood that the vehicle may be made of any size and that the details of construction and arrangement of parts have been solely given by way of example and are not to be taken in any way as limiting the scope of my invention, since various modifications (such as the use of an electric or other form of motor in place of an internal combustion engine, or the introduction of other means for moving the track and thereby steering the vehicle), may be incorporated as they become necessary or desirable in order to carry the invention into effect under different conditions and requirements which have to be fulfilled and these modifications must be understood as included within the scope of the invention as defined in the appended claims.

I claim:

1. A vehicle comprising an outer casing of spherical form, a track movably mounted in, and borne by, said casing, a carrier mounted to run upon said track and means for effecting movement of said track within said casing during travel of the vehicle.

2. A vehicle comprising an outer casing of spherical form, a track movably mounted in and borne by said casing, a carrier mounted to run upon said track, and means for effecting pivotal movement of said track within said casing.

3. A vehicle comprising an outer casing of spherical form, a track movably mounted in and borne by said casing, a carrier mounted to run upon said track, and means operable from said carrier for effecting pivotal movement of said track within said casing.

4. A vehicle comprising an outer casing of spherical form, a track movably mounted in and borne by said casing, a carrier mounted to run upon said track, and means extending between said carrier and said casing for adjusting the position of said track within said casing.

5. A vehicle comprising an outer casing of spherical form, a track movably mounted therein, a carrier mounted to run on said track, frames running against and on the outer flanges of said spherical outer casing, flexible cables passing over pulleys on said frames and round a shaft which is mounted on and can be turned from said carrier whereby said carrier and track may be moved about within said casing.

6. A vehicle comprising an outer casing of spherical form, a track movably mounted within said casing, a carrier mounted to run upon said track, and means adapted to oppose movement of said track relative to said casing in the direction in which said carrier runs on said track while allowing comparatively unopposed relative movement perpendicularly to said direction.

7. A vehicle according to claim 6 wherein said means for controlling relative motion comprise rolling bearing means threaded upon a wire stretched externally of said track in the plane of movement of said carrier.

JOHN ARCHIBALD PURVES.